(12) United States Patent
Chapman et al.

(10) Patent No.: US 10,346,911 B2
(45) Date of Patent: Jul. 9, 2019

(54) PRIVATE FUND EXCHANGE SYSTEM

(71) Applicant: Nasdaq, Inc., New York, NY (US)

(72) Inventors: Michael Chapman, New York, NY (US); Eric Folkemer, New York, NY (US); Alex Zinder, Shelton, CT (US)

(73) Assignee: NASDAQ, INC., New York, NY (US)

( * ) Notice: Subject to any disclaimer, the term of this patent is extended or adjusted under 35 U.S.C. 154(b) by 389 days.

(21) Appl. No.: 14/734,450

(22) Filed: Jun. 9, 2015

(65) Prior Publication Data

US 2015/0356677 A1 Dec. 10, 2015

Related U.S. Application Data

(60) Provisional application No. 62/009,705, filed on Jun. 9, 2014.

(51) Int. Cl.
*G06Q 40/04* (2012.01)
(52) U.S. Cl.
CPC .................................. *G06Q 40/04* (2013.01)
(58) Field of Classification Search
CPC ..................................................... G06Q 40/04
See application file for complete search history.

(56) References Cited

U.S. PATENT DOCUMENTS

| 4,412,287 A * | 10/1983 | Braddock, III | H04L 12/1804 705/37 |
| 7,496,531 B1 * | 2/2009 | Gastineau | G06Q 40/00 705/35 |
| 2001/0034692 A1 * | 10/2001 | McRedmond | G06Q 30/08 705/37 |
| 2001/0056393 A1 * | 12/2001 | Tilfors | G06Q 40/00 705/37 |
| 2003/0130952 A1 * | 7/2003 | Bell | G06Q 30/06 705/51 |
| 2006/0224485 A1 * | 10/2006 | Rothschild | G06Q 40/00 705/35 |

\* cited by examiner

*Primary Examiner* — Robert R Niquette
(74) *Attorney, Agent, or Firm* — Nixon & Vanderhye, P.C.

(57) ABSTRACT

The technology relates to allowing investors to electronically invest in private market investments, such as a private equity fund. System and methods described herein relate to an electronic private marketplace where investors can participate in a rule-based system for establishing and investing in private market assets, such as a private equity fund, during predetermined time periods for various buying and selling activities in the private marketplace.

19 Claims, 10 Drawing Sheets

LIVE AUCTION: Sample Fund

*Sample Fund*      🕗 *R. L. Investor*

Prior NAV: $11.00      NOV 13, 2014 12:07:15
View Fund Page

Open Period

*Expected Time Until Auction*

3:53:45

YOUR BEST ORDER   EDIT ORDERS   NEW ORDER

Message History

OT   You selected

BUY 100 $9.50
        OS     OP

For an estimated cost basis not including fees of

$950 ~ OC

12:05 – Good afternoon participants, the auction for Crystal Point LLC has begun. Anticipated execution time is 14:05. This begins the open period. Participants may submit, modify, or cancel orders at this time. The open period is expected to conclude at 14:05.

More History

Submit Order

Go back

Orders may be modified or cancelled during the open period.

FIG. 9

LIVE AUCTION: Sample Fund

*Sample Fund*

R. L. Investor

NOV 13, 2014 14:30:37

Prior NAV: $11.00
View Fund Page

Open Period / Commit Period — PS

*Expected Time Until Auction*

1:30:23

YOUR BEST ORDER      EDIT ORDERS      NEW ORDER

BUY 100 $9.50

Improve your success rate by bidding higher or increasing size

| ◀ Increase Price to $9.75 | $10.00 |
| ✚ Increase Size by +100 | +200 |

Message History

14:05 – The commit period has begun. The auction is expected to occur at 15:00.

14:02 – The open period will conclude in three minutes. At this time the commit period will begin and participants will no longer be able to cancel orders, reduce order quantities or decrease (increase) prices for sell (buy) orders.

12:05 – Good afternoon participants, the auction for Crystal Point LLC has begun. This is the beginning of the open period. Participants may submit, modify, or cancel orders at this time. The open period is expected to conclude at 14:05.

More History

FIG. 10

PRIVATE FUND EXCHANGE SYSTEM

CROSS-REFERENCE TO RELATED APPLICATION

This application claims the benefit of priority from U.S. Patent Application No. 62/009,705 filed Jun. 9, 2014.

BACKGROUND

Modern day electronic stock exchanges provide a robust marketplace for buyers and sellers, for example, to publicly trade shares of investments with great speed and volume. Clients can use the electronic exchanges to diversify their personal investments in order to create a broader financial portfolio. However, electronic stock exchanges are not the only method for investors to broaden their financial interests. For example, private markets are available, which could include private equity funds, where investors can make investments in various equity securities. Private equity funds differ from publicly traded stocks, for example, in that the fund usually consists of a limited partnership where each investor is a limited partner in the fund. Unlike publicly traded assets, private equity funds require a relatively longer process in setting up and receiving "partnership" in the fund. There is presently no system that allows investors to participate in a centralized electronic private market with greater ease.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The technology relates to allowing investors to electronically invest in private market investments, such as a private equity fund. As explained above, private equity funds require a relatively laborious process of setting up the fund and acquiring investors/partners for the fund. System and methods described herein relate to an electronic private marketplace where investors can participate in a rule-based system for establishing and investing in private market assets, such as a private equity fund, during predetermined time periods for various buying and selling activities in the private marketplace.

A non-limiting example aspect relates to a system configured to exchange private market funds. The system comprises a processing system having at least one processor, where the processing system is configured to generate orders for private market exchange, establish one or more time periods that employ one or more rules during each respective time period for conducting the private market exchange, attempt to match the order for the private market exchange during a specified time period of the one or more time periods, and generate, for display, a user interface conveying information related to the private market exchange.

As a non-limiting example, the one or more time periods include an open submission period where orders can be created, modified, and or canceled.

As a further non-limiting example, the one or more time periods include a commit period where specific restrictions relating the canceling orders and modifying size and price of orders are utilized.

As yet another non-limiting example, the one or more time periods include an auction period where orders are attempted to match.

As a further non-limiting example, the one or more time periods includes a solicitation period where unmatched orders and a clearing price are submitted to a participant in the exchange.

As yet another non-limiting example, the user interface allows for creation, modification, and/or cancellation of orders depending upon a current time with respect to the one or more time periods.

As a further non-limiting example, the user interface provides indication as to a time period of the one or more time periods and can convey an indication as to when an auction will start.

DETAILED DESCRIPTION

The system described herein provides electronic ordering and exchange of private market assets. For purposes of explanation only, and as a non-limiting example, private equity funds are discussed example private market assets bought/sold in the present system. Of course, the system envisions a variety of private market assets that can be bought and sold, and is not in anyway limited to private equity funds.

One aspect of the system broadens access for accredited investors to institutional quality private equity. This can be achieved, in part, by having standardized private equity funds registered under the Investment Company Act of 1940 where each fund can go through a qualifications process to receive registration with the system. Another aspect is to provide an alternative liquidity mechanism for investors where the system can standardize secondary transactions between current "Liquidity Providers" (LP) and other qualified buyers without disrupting the fund's distribution process and mechanics for discretionary tender offer programs. A further aspect is to maximize secondary liquidity success for participating investors by implementing an auction based trading platform (e.g., quarterly, monthly) scheduled by a fund and coinciding with net asset value (NAV) calculations and tender offer programs. This creates potential for introducing "Liquidity Providers" to provide depth and certainty of liquidity.

Another aspect of the system is to achieve the best price for all participating investors by having auctions leverage the tender offer programs to serve as "true-up" on the traded price to NAV where an auction system will be designated to incentivize all participants to enter its best bid and offer, with the intention to achieving the best trading price for each auction event. Yet another aspect of the system is to streamline, simplify, and standardize the process for participating investors by using automated documents and back-office processing of transactions and creating unique identifiers (CUSIPs) for all funds on the platform.

A common trait across the various alternative asset strategies is that they are available to accredited investors. Certain proposed common characteristics include, but are not limited to, an unlimited number of investors, having accredited investors only, taxing as RIC under subchapter M, 1099 tax reporting, no capital calls, low minimum investment requirements, periodic tender/redemption offers, monthly (or quarterly) NAV disclosure, low minimum investment requirements, single manager fund or fund-of-funds structure, and fund shares continuously offered. There are also certain proposed fund qualification requirements which include, but are not limited to, (1) each fund needing to submit a qualifications application to ensure standardization of product, (2) a fund must meet a NAV minimum, (3) each fund must also satisfy certain disclosure requirements, (4) secondary purchases and sale through private market (or affiliates) are subject to regulatory approvals, (5) each fund must have a defined distribution partner and/or sponsor and at least one "Liquidity Provider," (6) each fund may be required to use designated marketplace Administrators/Custodians, and/or (7) each fund must apply to create a unique identifier (CUSIP).

An example system for private market exchange differs from conventional exchange systems in that it allows for buyers/sellers to engage in a process for exchanging private assets over a period of time. As discussed in further detail below, the system employs several time frames in which the buyers/sellers can engage in different aspects of exchange. The system thus provides an easy-to-use electronic marketplace allowing individuals to conduct exchange of private assets in a flexible and easy manner.

Figure 1:
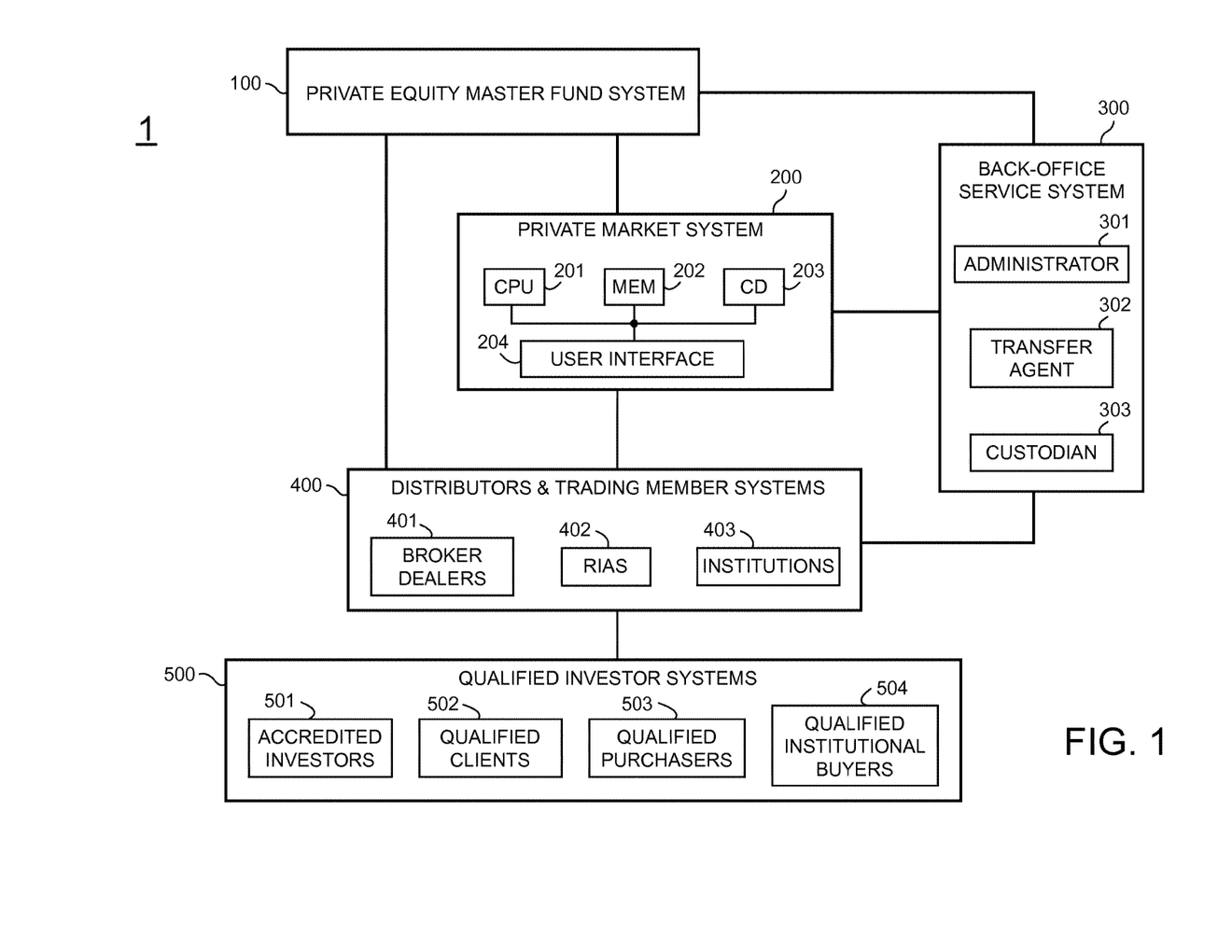
FIG. 1 is a non-limiting example block diagram showing a system for private market exchange.

FIG. 1 illustrates a non-limiting example block diagram of a private market exchange system 1. It should be appreciated that one or more elements in the system comprise an electronic terminal and/or server enabling electronic exchange of private assets. For example, the terminals and/or servers can communicate data messages between other terminals and/or servers allowing different components of the system to process the data messages in order to conduct the exchange.

The system 1 can include a private equity master fund system 100, a private market exchange system 200, a back-office services system 300, a distributor and trading members system 400, and a qualified investors system 500. The private equity master fund system 100 coordinates activity with the private market system 200, back-office services system 300, and distributors and trading members system 400.

The qualified investors system 500 can include accredited investors 501, qualified clients 502, qualified purchasers 503, and/or qualified institutional buyers 504. Likewise, the back-office services system 300 can include an administrator 301, a transfer agent 302, and/or a custodian 303.

As a non-limiting example, the fund system 100 can engage in primary distribution and tender offer programs with distributors and trading members system 400. The primary distribution can include continuous capital being raised through placement agents, broker-dealers, and/or institutions. The private market exchange system 200 could also be used as an additional distribution engine to eligible investors.

The system 200 can engage in secondary trading, information disclosure, and data dissemination between the distributors and trading members 400, where the system 200 interacts with the private equity master fund system 100. Secondary trading can include periodic trading through the private market exchange system 200 (or affiliates) and can be subject to regulatory approvals. Market participants can include broker-dealers 401, registered investment advisors (RIA) 402, and/or institutions 403 where trading can occur on behalf of clients or individual's own accounts. The private market system 200 can include standardized funds, a fund qualifications review process, secondary trading through market participants, controlled disclosure of information, trade reporting and pricing dissemination to participants, and integration with administrators 301 and custodians 303.

The private market exchange system 200 can also include at least one central processing unit (CPU) 201, at least one memory 202, at least one communication device 203, as well as at least one user interface 204. The communication device (CD) 203 can be, for example, a network interface device that can connect to various systems of a network. The connection can be wired, optical, or wireless and can connect over a Wi-Fi network, the Internet, or a cellular data service, for example. The communication device 203 can also be an input/output device that allows the system 200 to place the data on a computer-readable storage medium. It should be appreciated that the communication device 203 is capable of sending and receiving data (i.e. a transceiver). It should be appreciated that the components (i.e., CPU 201, memory 202, CD 203, user interface 204) comprising at least a portion of the private market system 200 are also present in each component of the system 1. That is, the private equity master fund system 100, back-office services system 300, distributors and/or trading members system 400, and/or qualified investors system 500 can also include at least a CPU, memory, communication device, and/or user interface.

Figure 2:
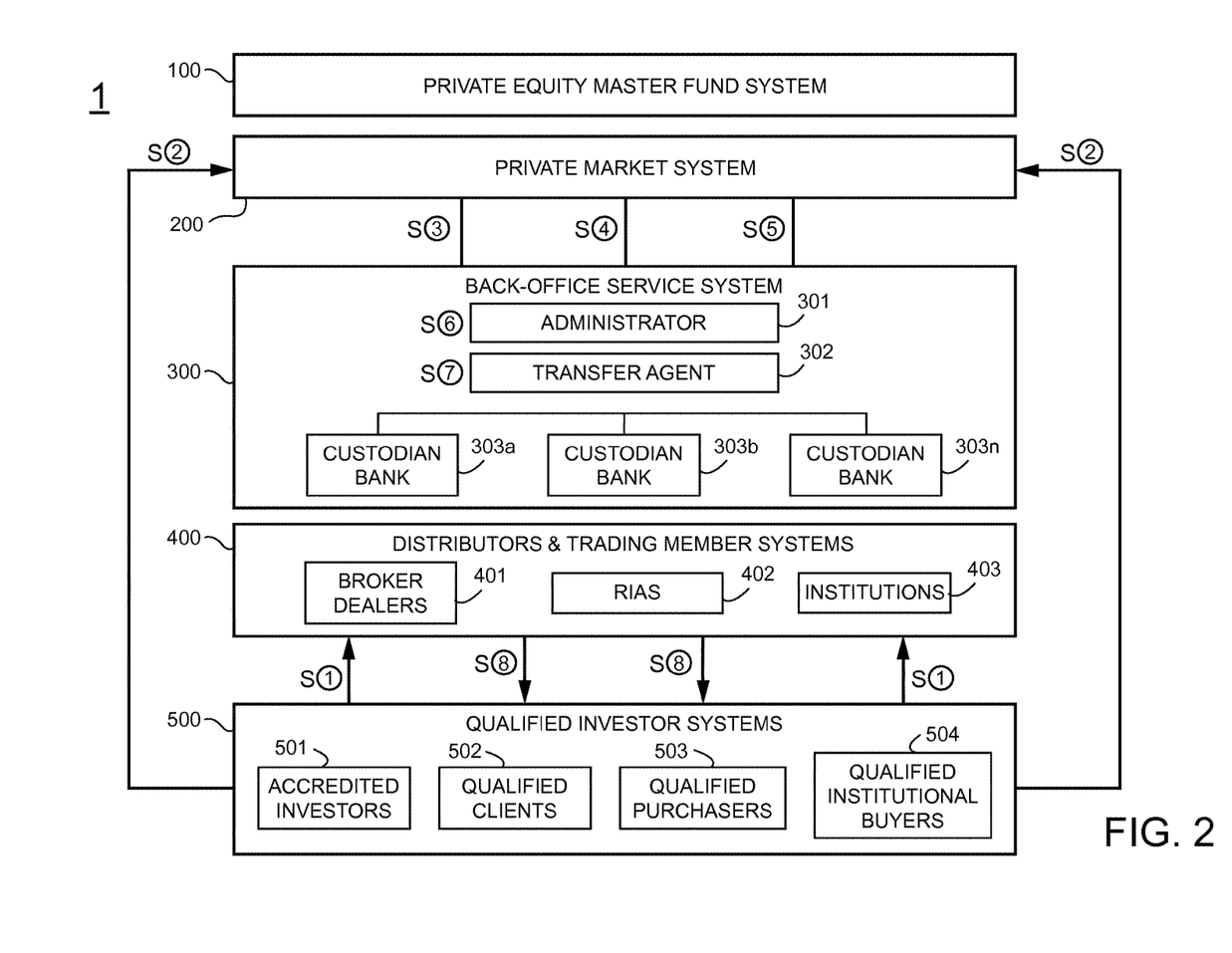
FIG. 2 is a non-limiting example flow of processes between components of the system.

FIG. 2 illustrates an example flow of processes between the different components of system 1. The process can begin by qualified investors system 500 submitting sell interests to their distributor systems 400 (e.g., current investors) or submitting buy interests to their distributor system 400 (e.g., new investors) (S1). Distributors/trading member systems 400 can consolidate interest and submit them to the private market exchange system 200 (S2). It should be appreciated that the communication between components can be carried out using electronic data messages that are communicated, for example, using one or more communication devices (e.g., a transceiver).

The private market exchange system 200 can then collect interest and maintain a book of orders (S3), perform matching calculations and identify a clearing price (S4), and identify all transactions at clearing price and notify participants, administrator 301, and transfer agent 302 (S5). Back office services system 300 can allow for an administrator to receive final transactions, begin the final approval process, and prepare appropriate tax documents (S6).

A transfer agent 302 can notify the appropriate custodians 303a-n and signal the transfer of shares and funds between participants. After the transactions are settled, transfer agent 302 can update the ledger (S7). Distributors 400 can then allocate shares to appropriate investors (S8).

As discussed above, conventional private equity funds require a more engaged process of having to work with the fund administrator in order to obtain a share in the fund. The system 1 improves on these techniques by providing an easy to use interface and method for making portions of these fund available to certain parties and allowing the parties to more expeditiously conduct transactions via the private market exchange system 200.

Figure 3:
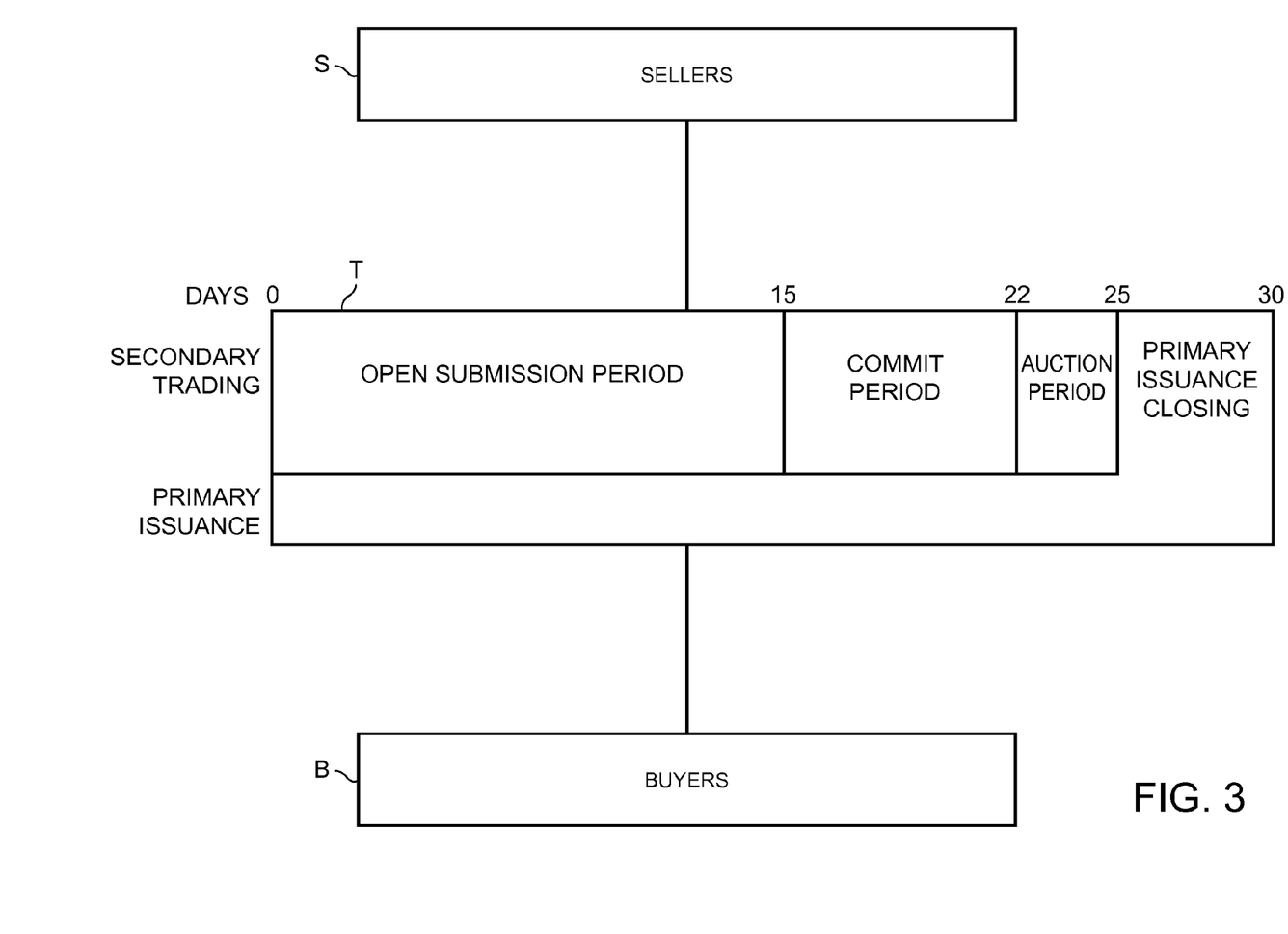
FIG. 3 is a non-limiting example time period used by the system for conducting exchange.

FIG. 3 illustrates a non-limiting example timeline T for buyers B and sellers S to conduct exchange of private equity funds. Unlike conventional exchange systems where exchanges can take place during the course of a day (in many cases nearly instantaneous), the system 1 conducts auctions over longer periods of time (e.g., 30 days). During this time frame, there are several different periods in which certain aspects of the exchange can occur.

As a non-limiting example, the first 15 days provides for an open submission period where participants may enter, modify, and/or cancel orders. During this time period orders may be "blind," but will contain price limit, quantity, and a minimum quantity threshold. Buyers can enter into the secondary marketplace before entering into the primary issuance. During the open period, participants can submit one or several limit orders to buy or sell shares and can also modify and cancel orders during this period.

Day 15 marks the end of the open submission period where days 15-22 begin the commit period. During the commit period, participants can enter new orders, or increase the size of existing orders or improve prices of existing orders. During this period, however, buyers cannot cancel orders, reduce the size of orders (or lessen the price of existing orders). The auction time is also finalized, announced, and a "countdown" process begins.

Day 22 marks the end of the commit period where days 22-25 entail the auction period. During the auction period, an auction is attempted where, once all orders are submitted, the highest priced buy orders are matched against the lowest priced sell orders until all remaining buy orders have a lower price than all remaining sell orders. The transaction clearing price can be the price of the last matched buy and sell order if the prices are the same. It should be appreciated that if the last matched buy and sell orders have different prices, the remaining unmatched interest can be used to determine the specific clearing price, but the clearing price can be between the last matched buy and last matched sell price.

Orders that are matched at the same price can be allocated shares on pro rata based on size. If the auction concludes with no action being taken (or minimum parameters are not satisfied), the auction can be delayed for a specified time period (e.g., hours, days) and then re-run for a final solicitation of interest. Buying participants that did not complete their transaction during the auction can optionally transfer into the primary offering.

The system can disseminate a clearing price and the imbalance (if any) to solicit final interests in the auction. During the solicitation period, if the auction has some matched shares, the clearing price is sent to participants along with the number of shares unmatched to buy or sell. Participants having orders committed may submit new orders at the clearing price, but may not modify existing orders. Only participants with at least one live order in the auction may buy or sell additional shares at the clearing price during this period. Other participants may not participate in the solicitation. Trade reporting information will be disseminated to the transfer agent, fund administrator, and trading members.

The period concludes in days 25-30 which entail primary issuance closing. It should be appreciated that these time periods allow for efficient and expedient creation and exchange of assets in private equity funds, as well as other private market assets. The time periods also establish the "rules" for conducting various aspects to the exchange in order to meet the financial requirements and goals of the private equity fund. The system carries out the exchange during these relevant time periods in order to facilitate the efficient processing of transactions for private assets.

Figure 4:
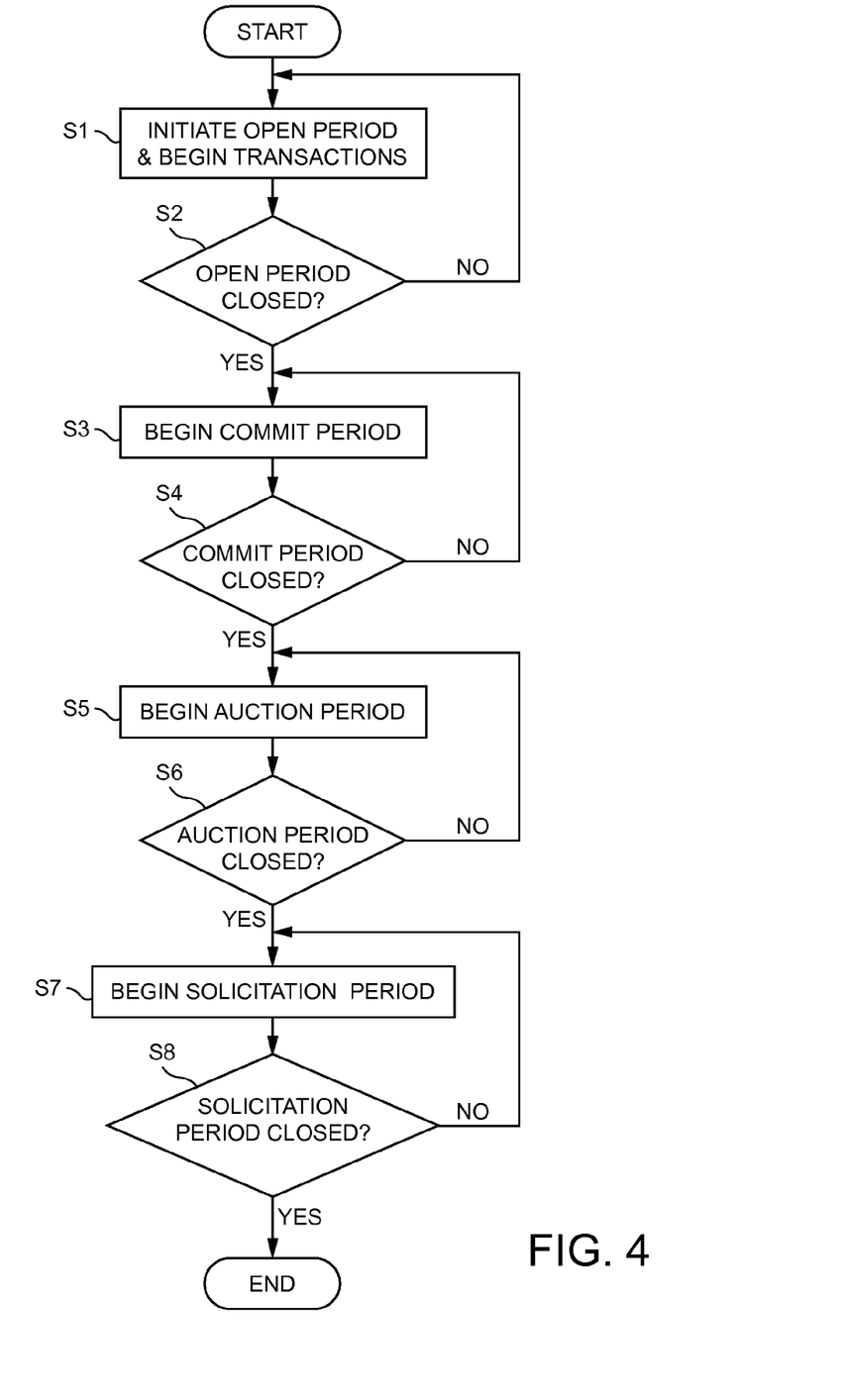
FIG. 4 is a non-limiting example flowchart illustrative a flow of processes used by the system.

FIG. 4 illustrates an example flow of processes for participating in a private market exchange system 200. The process begins by initiating the open period where transactions can be created, modified, and/or canceled by participants (S1). This period runs for a specified time in which the system transitions from the open period when the period closes (S2). The process transitions to the commit period (S3) where, as explained above, participants can no longer cancel, reduce the size of existing orders, and/or worsen the price of existing orders. The commit period precedes the auction period and when the commit period ends (S4), the process proceeds to the auction period (S5).

During the auction period, the orders are attempted to be matched by the system 1 where remaining orders can be stored in an order book. Once the auction period comes to an end (S6), the system 1 begins a solicitation period (S7) where a clearing price is sent to participants along with the number of shares unmatched to buy/sell. The participants can submit new orders at the clearing price but cannot modify existing orders. Upon finishing the solicitation period (S8), the system begins primary issuance closing.

The timelines and rules established during each time frame allow for private funds to be exchanged using a centralized interface. This opens up the possibility for greater and more expedient exchange and provides flexible liquidity for non-liquid assets.

Figure 5:
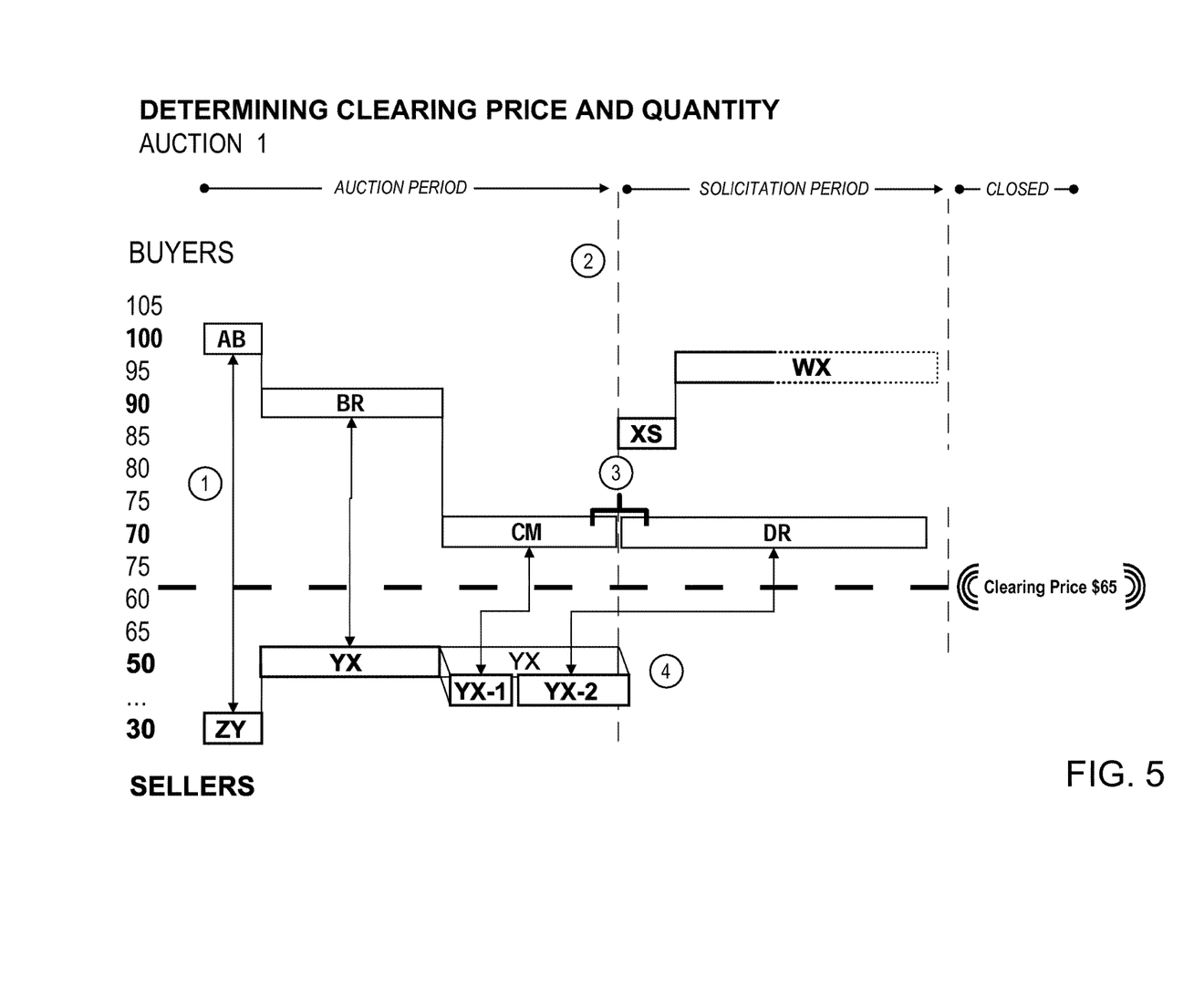
FIG. 5 shows a non-limiting example flow of processes for determining a clearing price in an electronic exchange.

FIG. 5 shows a non-limiting example of an auction between parties carried out by the system 1. The example in FIG. 5 shows a timeline and process after the open submission and commit periods.

As discussed previously, the system 1 provides different time periods in which the auction will commence and be carried out. During the auction period, the system 1 will begin to attempt matching orders between a buyer and seller. In one non-limiting example, the system 1 will attempt to match the most aggressive orders with each other during the auction period (1). For example, order AB contains an order data message for an order to buy shares of a private financial asset where seller order ZY is attempting to sell shares of the asset. For example, order AB may contain an order data message to buy shares of an asset for $100 per share where order ZY may contain an order data message to sell the asset for $30 per share. Likewise order BR could contain an order data message to buy shares of an asset for $90 per share where order YX could contain an order data message to buy shares of an asset for $50 per share.

The system can continue to attempt to match orders during the auction period until the time for ending the auction period closes (2). In one example, the system 1 will stop attempting to match orders when the next match will not execute (e.g., when the next matched sell price is higher than the next matched buy price) (3). In the example shown in FIG. 5, order CM and order DR contain order data messages that can match with portions of sell order YX (shown as orders YX-1 and YX-2). In this case there is a tie between order CM and order DR in which the system can perform, in one non-limiting example, a pro-rata split of the order. The clearing price can then be calculated by the system based on existing interest and a last matched buy and sell pair. In this example, the determined clearing price is $65.

Upon ending the auction period, the system begins the solicitation period (4). During the solicitation period, the solicitation information is disseminated and participants in the auction that have orders may submit additional order to buy/sell at the clearing price. If additional buyers arrive during this time period, orders that were used in determining the clearing price (e.g., order CM and order DR) have priority over the new additional buyers. Once the solicitation period ends, the system 1 closes the auction and the orders that can be matched are matched with each other.

Figure 6:
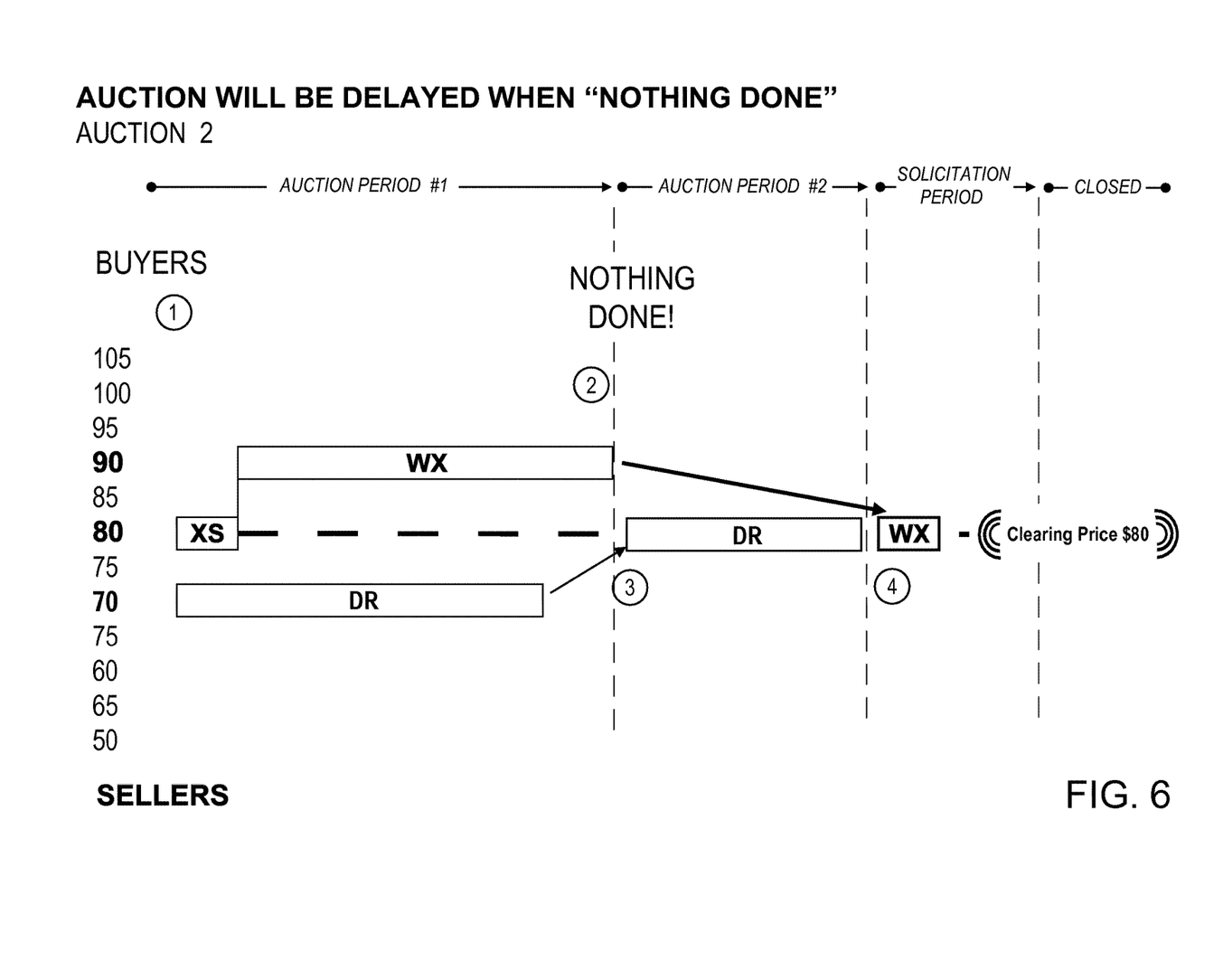
FIG. 6 shows another non-limiting example flow of processes for determining a clearing price in an electronic exchange.

FIG. 6 shows a non-limiting example of an auction that can be delayed if the system 1 enters a "nothing done" state. In the example shown in FIG. 6, the system 1 enters the auction period where order XS offers to sell shares of a private financial asset for $80 per share. Order WX offers to sell shares of the private financial asset for $90 per share where order DR presently offers to buy the shares at $70 per share (1). In this example, if there are no sell orders priced below buy orders, the auction will be in a "nothing done" state. The auction can then be delayed for a period of time that is customizable by the auction administrators. This information could be communicated to all participants via an auction portal (e.g., a live auction portal).

The system 1 can communicate to participants that in order to execute shares, they must submit more aggressively priced orders (2). In this example, order DR is adjusted to buy at $80 per share which matches shares with order XS for a clearing price of $80, in which the auction period can then end and the solicitation period can begin (3). Thus, in the example shown in FIG. 6, the system effectively employs two auction periods (e.g., auction period #1 and auction period #2). In this example, order WX is also adjusted to lower price to partially participate at the clearing price during the solicitation period. That is, order WX is modified to offer to sell shares at $80 per share (at least partially) in order to solicit an offer to sell during the solicitation period (4). The system can then attempt to match the most appropriate orders together during this time period in which the system will then close the auction for the orders at hand.

Figure 7:
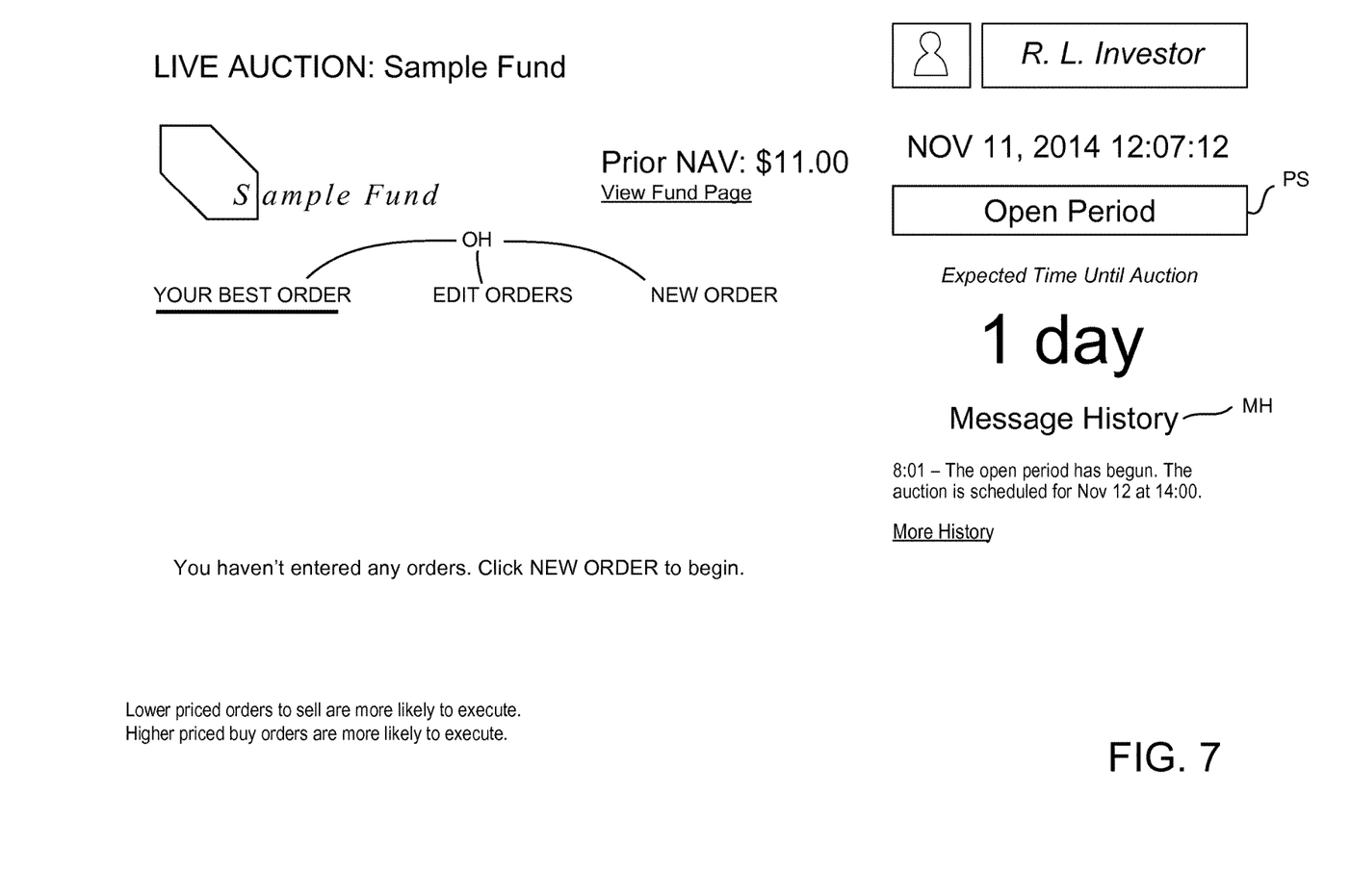
FIG. 7 shows a non-limiting example user interface generated by the system.

FIGS. 7-10 show non-limiting example user interfaces employed by the system 1. In FIG. 7, the system can show an introduction screen in which an order history OH is displayed as well as information indicating a period status PS. In this example shown in FIG. 7, the period status PS is presently at the open period (e.g., prior to the commit period).

A message history MH will also display one or more messages (e.g., from most recent to least recent) related to a particular auction. In this example, the message history MH indicates that the open period has begun and indicates when the auction is scheduled.

Figure 8:
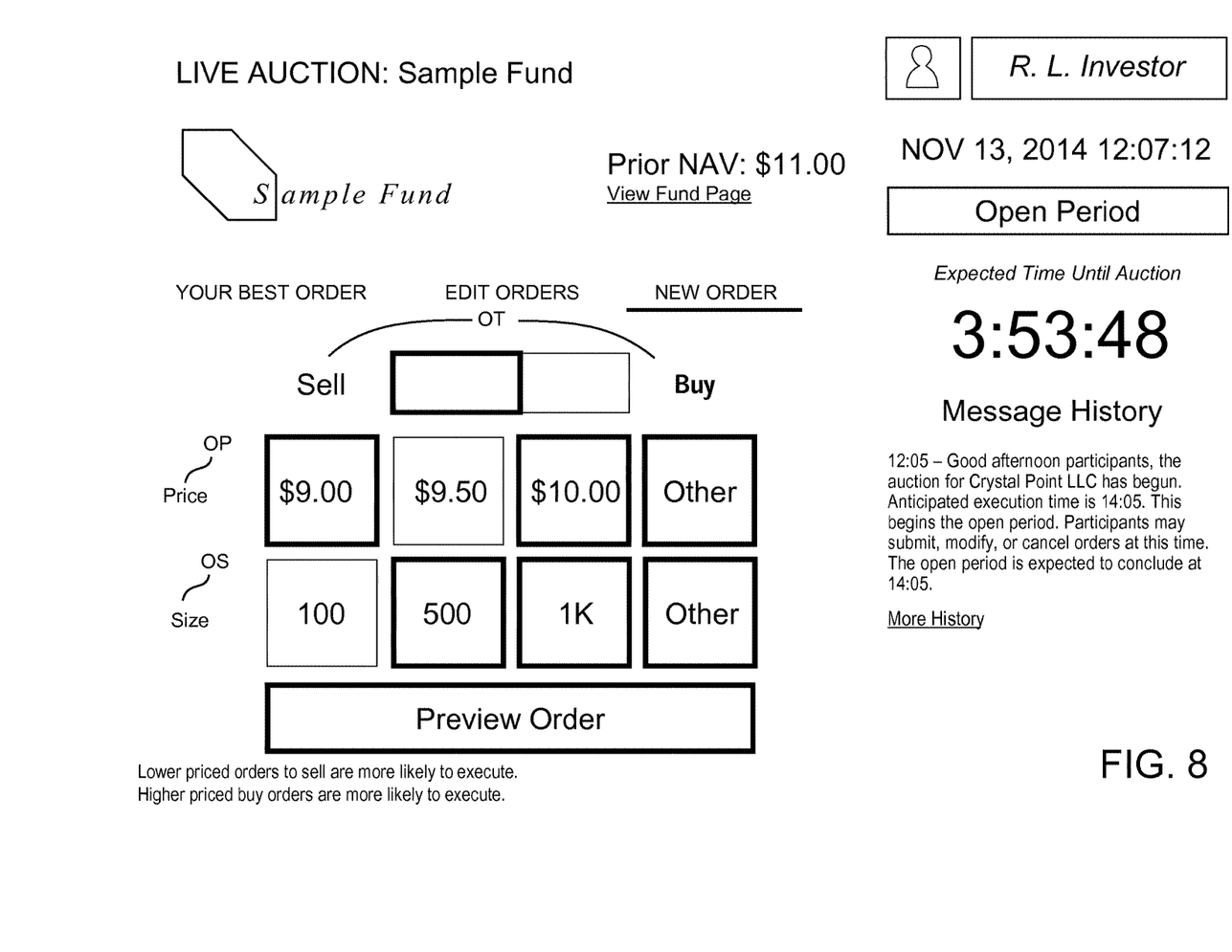
FIG. 8 shows a non-limiting example user interface generated by the system.

FIG. 8 shows a non-limiting example interface for selecting different attributes related to an order. In the example shown in FIG. 8, a user can designate an order type OT (e.g., buy/sell). The user can also select one or more order prices OP and/or one or more order sizes OS.

In this example, shares are being bought/sold for Crystal Point LLC and a user can designate various aspects related to the creation of a new order. Upon selecting the desired attributes, the user can preview the order before submitting the order.

Figure 9:
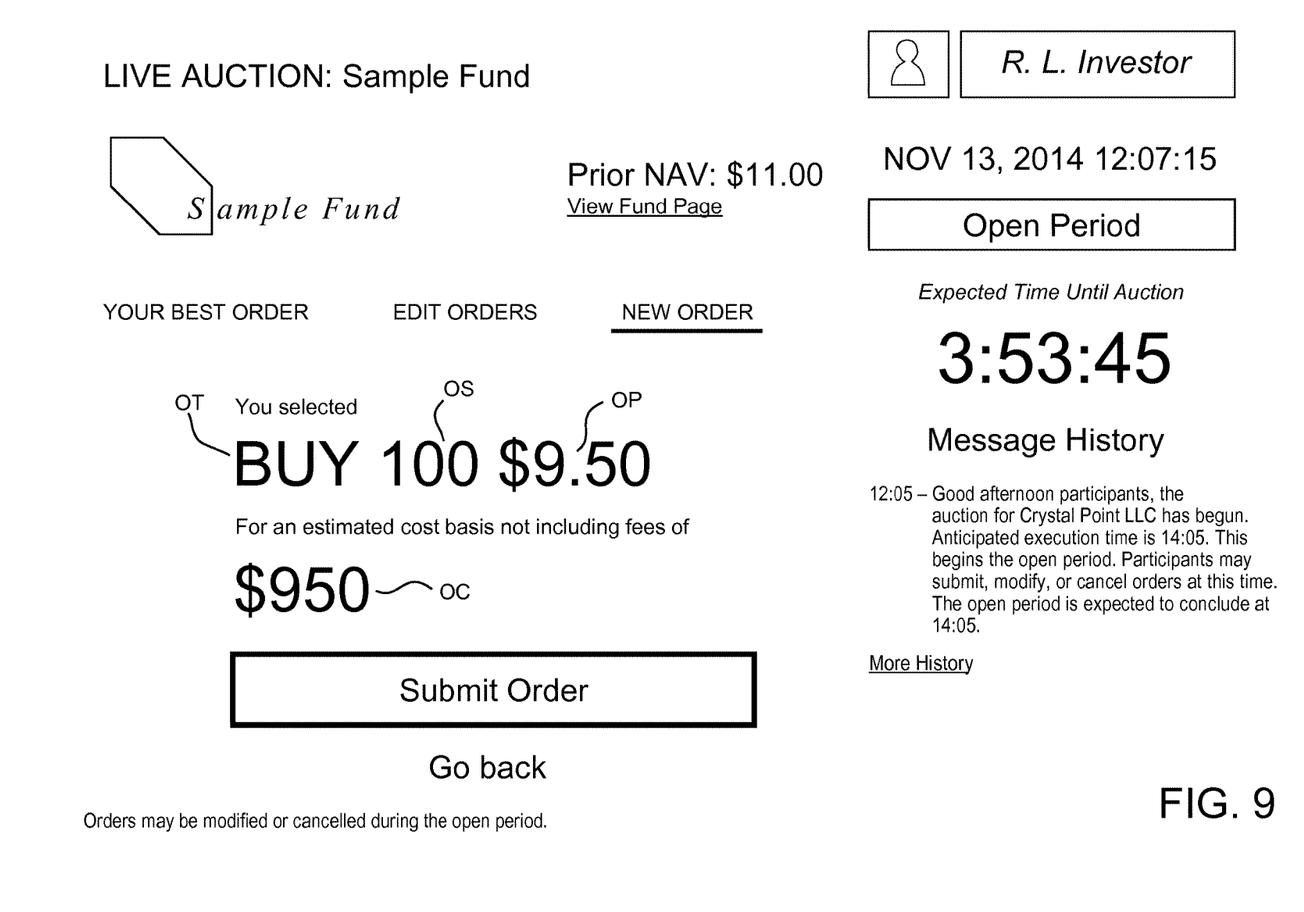
FIG. 9 shows a non-limiting example user interface generated by the system.

FIG. 9 shows a non-limiting example interface where order details have been selected and the order is previewed before being submitted. In the example shown in FIG. 9, the user has selected an order type OT of buy for a size OS of 100 shares and a price OP of $9.50 per share.

The system can display an estimated order cost OC (in this example as $950) providing an indication for a user as to the total cost should the entire order match. FIGS. 7-9 thus show a non-limiting example of order creation during the open period.

Figure 10:
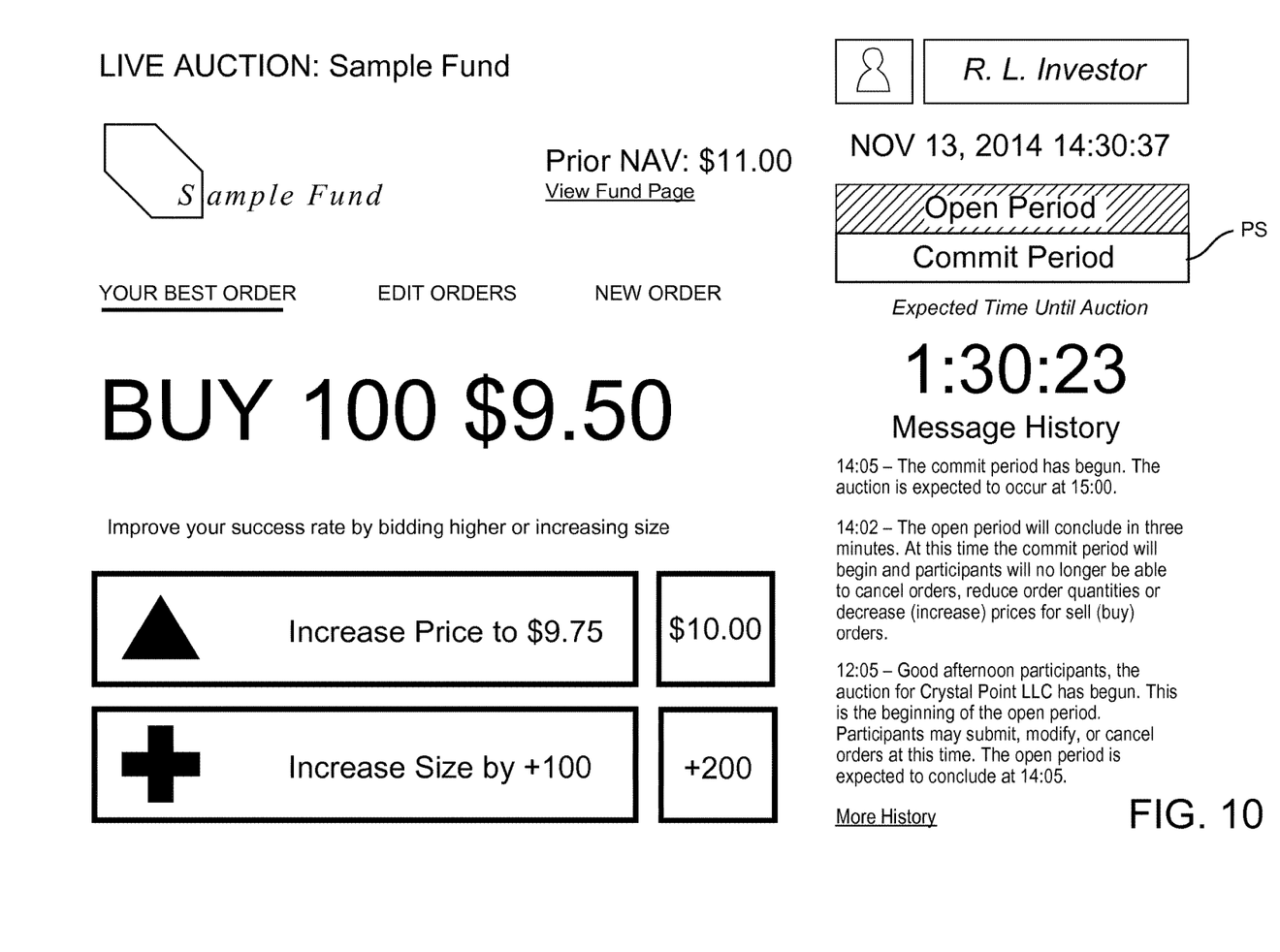
FIG. 10 shows a non-limiting example user interface generated by the system.

FIG. 10 shows a non-limiting example for modifying an order. In the example shown in FIG. 10, the system is transitioning from the open period to the commit period. The period status PS reflects this change. The system can allow the user to modify the order during this time period. However, during the commit period the user can no longer cancel an order, reduce an order quantity, decrease a price for sell, and/or increase a price for buy.

In this case, the user is attempting to buy 100 shares at $9.50 per share. As the user has entered the commit period, the system will no longer allow the user to decrease the order quantity or price but can increase either in order to increase their chances to match with other orders during the exchange.

It should be appreciated that the interfaces shown in FIGS. 7-10 are non-limiting, and the system can employ a variety of interfaces in which to conduct the private asset exchange. It should also be appreciated that the interfaces can be provided on any of the terminal devices shown in system 1 as well as any server devices present in system 1.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A system, comprising:
    qualified investor systems including, at least, one or more terminal devices having processing circuitry having a processor, a memory, and a communication device, the qualified investor systems configured to communicate data messages including orders for processing transactions associated with private market funds, the data messages communicated to distributor systems for consolidation and submission; and
    an electronic private market exchange system including at least a server system having a processor, a memory, and a communication device, the memory of the storing predefined rules associated with one or more time periods for processing the transactions, the private market exchange system configured to communicate data messages from the qualified investor systems via the distributor systems and further configured to communicate with a back-office service system, the memory storing computer readable instructions that, when executed by the processor, cause the electronic private market exchange system to:
        receive one or more order data messages from the one or more terminal devices and store the one or more order data messages in an orderbook stored in the memory of the system;
        access the memory and determine a rule, from the predefined rules, associated with a current time period and process the one or more order data messages based on the rule associated with the current time period thereby allowing the system to efficiently process the transactions associated with the private market funds;
        determine if the current time period is within a first time period and allow for modification of one or more orders in the one or more order data messages during the first time period by accepting user input to modify the one or more orders;
        determine if the current time period is within a second time period and attempt to match one or more orders in the one or more order data messages during the second time period with one or more orders stored in the order book while storing unmatched orders in the order book for matching at another point in time; and
        generate for display a user interface including a portal having display elements that include, at least, the current time period associated with an auction for an order, an amount of time associated with the current time period, a type, price, and size associated with the order,
    wherein the electronic private market exchange system is configured to identify all transactions at a clearing price and notify the back-office server systems for beginning a final approval process.

2. The system of claim 1, wherein one or more time periods include an open submission period where orders can be created, modified, and/or canceled.

3. The system of claim 1, wherein one or more time periods include a commit period where specific restrictions relating to canceling orders and modifying size and/or price of orders are utilized.

4. The system of claim 1, wherein one or more time periods include an auction period where orders in the order data messages are attempted to match.

5. The system of claim 1, wherein one or more time periods includes a solicitation period where unmatched orders and a clearing price are submitted to a participant in the exchange.

6. The system of claim 1, further comprising a back-office service system providing administrative resources that include, at least, receiving final transactions, initiating a final approval process, and preparing appropriating documentation related to taxes, the back-office service system further including a transfer agent that updates a ledger after transactions are settled.

7. The system of claim 1, wherein the auction for the order can occur over a time period of at least 30 days.

8. The system of claim 1, wherein the user interface allows for creation, modification, and/or cancellation of orders depending upon the current time period.

9. The system of claim 1, wherein if the auction concludes with no action taken, the auction can be delayed for a specified period of time.

10. A non-transitory computer-readable storage medium comprising computer readable code which, when executed by a computer having at least a processor and a memory configured to store predefined rules associated with one or more time periods for conducting exchange, causes the computer to:
    receive one or more order data messages from one or more terminal devices and store the one or more order data messages in an orderbook stored in a memory of the computer;
    access the memory and determine a rule, from the predefined rules, associated with a current time period and process the one or more order data messages based on the rule associated with the current time period thereby allowing the computer to efficiently process the transactions associated with the private market funds;
    determine if the current time period is within a first time period and allow for modification of one or more orders in the one or more order data messages during the first time period by accepting user input to modify the one or more orders;
    determine if the current time period is within a second time period and attempt to match one or more orders in the one or more order data messages during the second time period with one or more orders stored in the order book while storing unmatched orders in the order book for matching at another point in time; and generate for display a user interface including a portal having display elements that include, at least, the current time period associated with an auction for an order, an amount of time associated with the current time period, and a type, price, and size associated with the order.

11. The non-transitory computer-readable storage medium of claim 10, wherein one or more time periods include a commit period where specific restrictions relating to canceling orders and modifying size and/or price of orders are utilized.

12. The non-transitory computer-readable storage medium of claim 10, wherein one or more time periods include an auction period where orders in the order data messages are attempted to match.

13. The non-transitory computer-readable storage medium of claim 10, wherein one or more time periods includes a solicitation period where unmatched orders and a clearing price are submitted to a participant in the exchange.

14. A system, comprising:

an electronic private market exchange system including a processing system having at least one processor, a memory, and a communication device, the private market exchange system configured to communicate data messages from qualified investor systems and communicate with a back-office service system, the memory configured to store predefined rules associated with one or more time periods for processing transactions, and the memory configured to store, at least, computer readable instructions that, when executed by the processor, cause the system to:

receive one or more order data messages from the one or more terminal devices and store the one or more order data messages in an orderbook stored in the memory;

access the memory and determine a rule, from the predefined rules, associated with a current time period and process the one or more order data messages based on the rule associated with the current time period thereby allowing the system to efficiently process the transactions associated with the private market funds; and generate for display a user interface including a portal having display elements that include, at least, the current time period associated with an auction for an order, an amount of time associated with the current time period, and a type, price, and size associated with the order.

15. The system of claim 14, wherein the processing system is further configured to determine if the current time period is within a first time period and allow for modification of one or more orders in the one or more order data messages during the first time period by accepting user input to modify the one or more orders.

16. The system of claim 15, wherein the processing system is further configured to determine if the current time period is within a second time period and attempt to match one or more orders in the one or more order data messages during the second time period with one or more orders stored in the order book while storing unmatched orders in the order book for matching at another point in time.

17. The system of claim 14, wherein one or more time periods include a commit period where specific restrictions relating to canceling orders and modifying size and/or price of orders are utilized.

18. The system of claim 14, wherein one or more time periods include an auction period where orders in the order data messages are attempted to match.

19. The system of claim 14, wherein one or more time periods includes a solicitation period where unmatched orders and a clearing price are submitted to a participant in the exchange.

* * * * *